United States Patent
Park et al.

(10) Patent No.: US 9,670,368 B2
(45) Date of Patent: Jun. 6, 2017

(54) ANTI-BACTERIAL AND ANTI-FOULING COATING COMPOSITION, FILM USING THE SAME, METHOD OF PRODUCING THE SAME AND PRODUCT HAVING THE FILM

(71) Applicants: SAMSUNG ELECTRONICS CO., LTD., Suwon-si, Gyeonggi-do (KR); SNU R&DB FOUNDATION, Seoul (KR)

(72) Inventors: Byung Ha Park, Suwon-si (KR); Yong Seok Choi, Seoul (KR); Soo-Jin Park, Hwaseong-si (KR); Jong Chan Lee, Seoul (KR); Yong Suk Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 168 days.

(21) Appl. No.: 14/586,440

(22) Filed: Dec. 30, 2014

(65) Prior Publication Data

US 2015/0191608 A1 Jul. 9, 2015

(30) Foreign Application Priority Data

Jan. 9, 2014 (KR) .................. 10-2014-0002845

(51) Int. Cl.
*C09D 5/00* (2006.01)
*C09D 5/16* (2006.01)
(Continued)

(52) U.S. Cl.
CPC ............. *C09D 5/1668* (2013.01); *C09D 5/00* (2013.01); *C09D 127/12* (2013.01);
(Continued)

(58) Field of Classification Search
CPC .. C09D 5/1668; C09D 143/04; C09D 127/12; C09D 139/00
See application file for complete search history.

(56) References Cited

U.S. PATENT DOCUMENTS

| 8,465,775 B2 * | 6/2013 | DeSimone ........... A61K 9/5146 424/489 |
| 8,669,319 B2 * | 3/2014 | Dams ................. C08F 8/44 428/421 |

(Continued)

FOREIGN PATENT DOCUMENTS

| EP | 2 070 967 A1 | 6/2009 |
| JP | 06-239941 | * 8/1994 |

(Continued)

OTHER PUBLICATIONS

G. Johnson et al., "Cell interactions with perfluoropolyether-based network copolymers," *Journal of Biomaterials Science, Polymer Edition*, vol. 10, No. 2, Dec. 1999, pp. 217-233 with cover pages (2).

(Continued)

*Primary Examiner* — Margaret Moore
(74) *Attorney, Agent, or Firm* — Staas & Halsey LLP

(57) ABSTRACT

A single coating composition providing both anti-bacterial and anti-fouling functions when applied to a product and a method of preparing same. The composition includes a fluorine-based substituent according to the following Formula 1 and at least one ammonium-based substituent according to the following Formula 2:

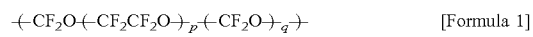

[Formula 1]

wherein p and q each independently is an integer of 1 to 100,

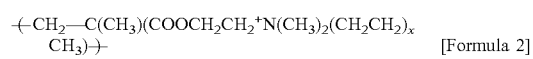

[Formula 2]

wherein x is an integer of 1 to 20.

13 Claims, 7 Drawing Sheets

(51) Int. Cl.
 *C09D 127/12* (2006.01)
 *C09D 139/00* (2006.01)
 *C09D 143/04* (2006.01)
(52) U.S. Cl.
 CPC ......... *C09D 139/00* (2013.01); *C09D 143/04* (2013.01); *Y10T 428/3154* (2015.04)

(56) References Cited

U.S. PATENT DOCUMENTS

| | | | |
|---|---|---|---|
| 9,334,418 B2* | 5/2016 | Chang | |
| 2005/0096244 A1* | 5/2005 | Audenaert | C08G 65/007 510/356 |
| 2006/0047032 A1* | 3/2006 | Miller | C08K 5/521 524/127 |
| 2007/0173426 A1* | 7/2007 | Longoria | C04B 41/4994 510/238 |
| 2010/0233492 A1* | 9/2010 | Dams | C03C 17/30 428/429 |

FOREIGN PATENT DOCUMENTS

| | | |
|---|---|---|
| JP | 2011-505488 | 2/2011 |
| WO | WO 96/31546 A1 | 10/1996 |

OTHER PUBLICATIONS

Extended European Search Report mailed May 22, 2015 for European Patent Application No. 15150215.0.
Espacenet Abstract, Publication No. JP2011505488, Published Feb. 24, 2011.

* cited by examiner

GENERAL GLASS

ANTI-BACTERIAL AND
ANTI-FOULING GLASS

ANTI-BACTERIAL AND ANTI-FOULING COATING COMPOSITION, FILM USING THE SAME, METHOD OF PRODUCING THE SAME AND PRODUCT HAVING THE FILM

CROSS-REFERENCE TO RELATED APPLICATIONS

This application claims the benefit of Korean Patent Application No. 10-2014-0002845, filed on Jan. 9, 2014, in the Korean Intellectual Property Office, the disclosure of which is incorporated herein by reference.

BACKGROUND

1. Field

Embodiments of the present invention relate to an anti-bacterial and anti-fouling coating composition to provide both anti-bacterial and anti-fouling functions on a surface of a panel or the like, of a display device, a film coated with the composition, a method of producing the same and a product having the film.

2. Description of the Related Art

An anti-glare (AG) coating, an invisible-fingerprint (IF) coating or an anti-fingerprint (AF) coating is commonly used as a single functional coating method.

AG coating is a method of forming fine irregularities on the surface of a panel to reduce scattered reflection and thereby obtain anti-fingerprint effects. IF coating is a method of spreading a fingerprint component during fingerprint adhesion to reduce scattered reflection and thereby obtain anti-fingerprint effects. AF coating is a method of forming a coating layer on the surface of a panel by spraying or deposition to provide easy cleaning and improve slip sensation.

At present, most cellular phone manufacturers mass-produce display panels using anti-fouling coating. The anti-fouling coating has no function of eliminating microorganisms stained on the surface, thus providing an environment enabling growth and propagation of pathogenic bacteria upon application of a single functional coating layer and entailing a risk of causing skin troubles to users.

Accordingly, in order to maintain anti-fouling function and inhibit bacterial propagation, a conventional anti-bacterial glass or anti-bacterial coating glass containing an anti-bacterial metal (such as silver (Ag), copper (Cu) or zinc (Zn)) and is coated with an anti-fouling substance to provide multiple functions of anti-bacterial and anti-fouling functions. In this case, the anti-bacterial metal released upon adhesion of bacteria permeates into cell membranes of bacteria and interferes with metabolisms, to inhibit bacterial propagation and eliminate bacteria, but causes a problem of deterioration in anti-bacterial performance by the anti-fouling layer coated on the anti-bacterial glass and anti-bacterial coating glass.

SUMMARY

Therefore, it is one aspect of the present invention to provide a single coating composition which exhibits both anti-bacterial and anti-fouling functions when applied to products, and a method of producing the same.

It is another aspect of the present invention to provide a film using a single coating composition having anti-bacterial and anti-fouling functions and a product having the film.

Additional aspects of the invention will be set forth in part in the description which follows and, in part, will be obvious from the description, or may be learned by practice of the invention.

In accordance with one aspect of the present invention, an anti-bacterial and anti-fouling coating composition includes a compound including a fluorine-based substituent represented by the following Formula 1 and at least one ammonium-based substituent represented by the following Formula 2:

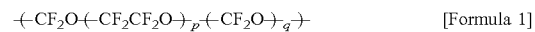

[Formula 1]

wherein p and q each independently represent an integer of 1 to 100,

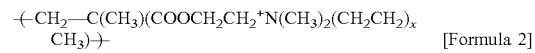

[Formula 2]

wherein x represents an integer of 1 to 20.

The compound may further include at least one silane-based substituent represented by the following Formula 3:

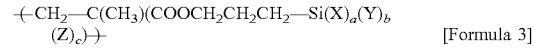

[Formula 3]

wherein X, Y and Z represent at least one of a methoxy group, an ethoxy group and a halogen element and a, b and c are integers satisfying an equation of $a+b+c=3$.

The compound may include a compound represented by the following Formula 4:

[Formula 4]

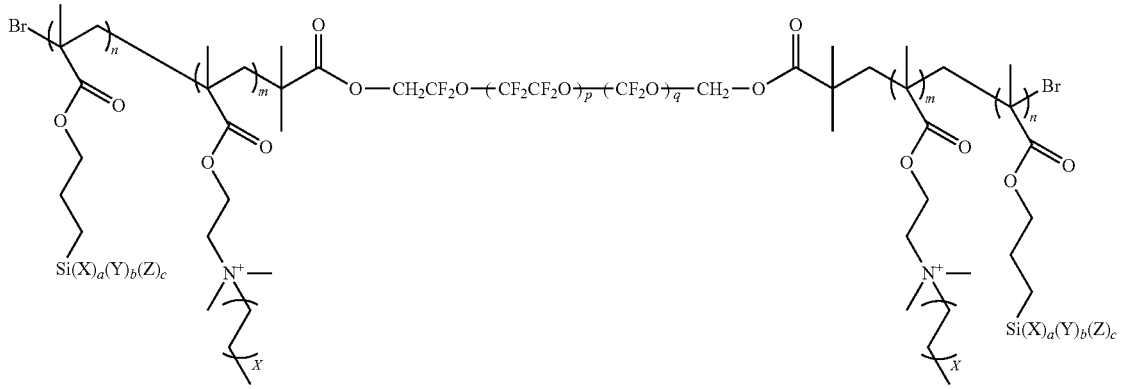

wherein m and n represent an integer of 1 to 100, p and q represent an integer of 1 to 100, x represents an integer of 1 to 20, X, Y and Z represent at least one of a methoxy group, an ethoxy group and a halogen element, and a, b and c are integers satisfying an equation of a+b+c=3.

The compound may include a compound represented by the following Formula 5:

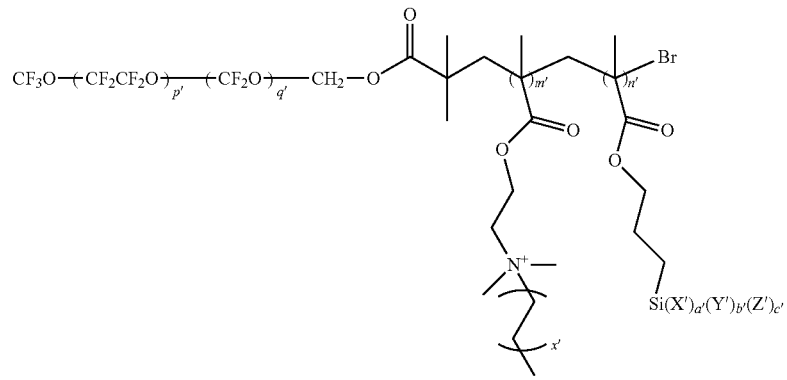

[Formula 5]

wherein m' and n' represent an integer of 1 to 100, p' and q' represent an integer of 1 to 100, x' represents an integer of 1 to 20, X', Y' and Z' represent at least one of a methoxy group, an ethoxy group and a halogen element, and a', b' and c' are integers satisfying an equation of a'+b'+c'=3.

The compound may include a compound represented by the following Formula 6 or 7:

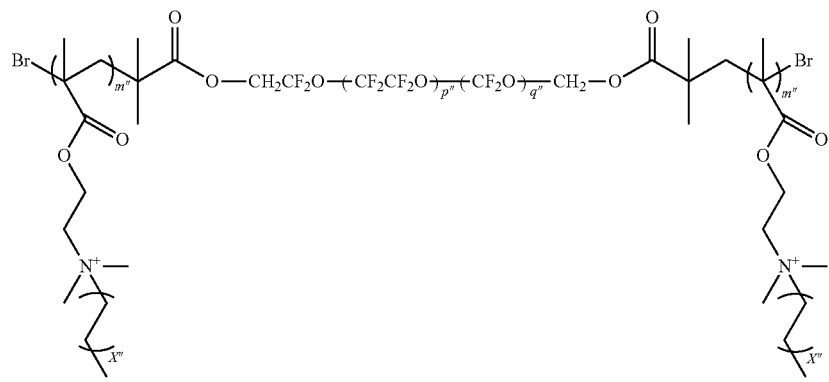

[Formula 6]

wherein m" represents an integer of 1 to 100, p" and q" represent an integer of 1 to 100, and x" represents an integer of 1 to 20,

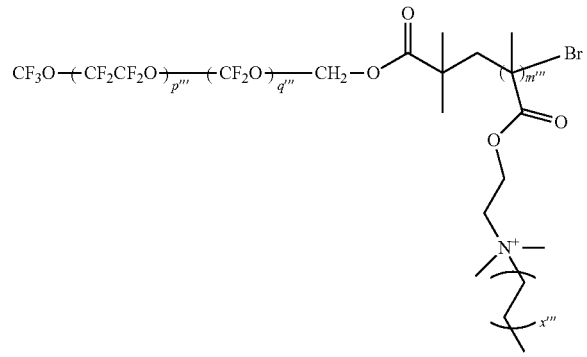

[Formula 7]

wherein m'" represents an integer of 1 to 100, p'" and q'" represent an integer of 1 to 100, and x'" represents an integer of 1 to 20.

In accordance with another aspect of the present invention, an anti-bacterial and anti-fouling coating composition includes a compound represented by the following Formula 8:

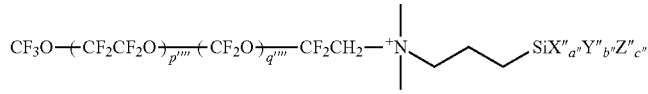

[Formula 8]

wherein p"" and q"" represent an integer of 1 to 100, X", Y" and Z" represent at least one of a methoxy group, an ethoxy group and a halogen element, and e, b", c" are integers satisfying an equation of a"-pb"-pc"=3.

In accordance with another aspect of the present invention, provided is an anti-bacterial and anti-fouling film formed using an anti-bacterial and anti-fouling coating composition including a compound including a fluorine-based substituent represented by the following Formula 1 and at least one ammonium-based substituent represented by the following Formula 2:

$$\leftarrow CF_2O\leftarrow CF_2CF_2O\rightarrow_p\leftarrow CF_2O\rightarrow_q\rightarrow$$ [Formula 1]

wherein p and q each independently represent an integer of 1 to 100, $$CH_2\!-\!C(CH_3)(COOCH_2CH_2{}^+N(CH_3)_2(CH_2CH_2)_x$$
$$CH_3)\!\rightarrow\!\!\!\!\!\!\!\!\!\!\!\!\!\!\!\!\!\!\!\!\!\!\!\!\!\!\!\!\!\!\!\!\!\!\!$$ [Formula 2]

wherein x represents an integer of 1 to 20.

The film may have a contact angle to water, of about 100 to about 180 degrees.

In accordance with another aspect of the present invention, provided is an anti-bacterial and anti-fouling film formed using an anti-bacterial and anti-fouling coating composition including a compound represented by the following Formula 8:

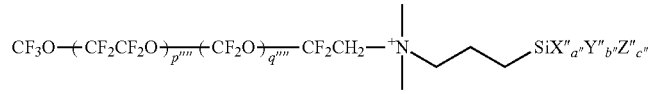

[Formula 8]

wherein p"" and q"" represent an integer of 1 to 100, X", Y" and Z" represent at least one of a methoxy group, an ethoxy group and a halogen element, and a", b", c" are integers satisfying an equation of a"-pb"-pc"=3.

The film may have a contact angle to water, of about 100 to about 180 degrees.

In accordance with another aspect of the present invention, an electronic device includes a display panel, and an anti-bacterial and anti-fouling film adhered to the display panel, wherein the anti-bacterial and anti-fouling film is formed using an anti-bacterial and anti-fouling coating composition including a compound including a fluorine-based substituent represented by the following Formula 1 and at least one ammonium-based substituent represented by the following Formula 2, or an anti-bacterial and anti-fouling coating composition including a compound represented by the following Formula 8:

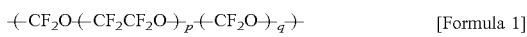  [Formula 1]

wherein p and q each independently represent an integer of 1 to 100,

[Formula 2]

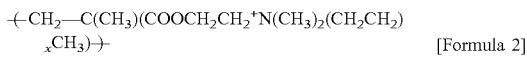  [Formula 2]

wherein x represents an integer of 1 to 20,

[Formula 8]

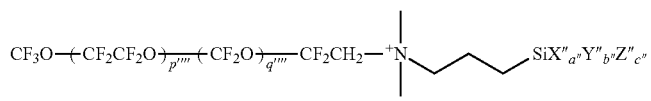

wherein p'''' and q'''' represent an integer of 1 to 100, X'', Y'' and Z'' represent at least one of a methoxy group, an ethoxy group and a halogen element, and A'', b'', c'' are integers satisfying an equation of a''−pb''−pc''=3.

In accordance with another aspect of the present invention, a method of preparing an anti-bacterial and anti-fouling coating composition includes mixing a radical polymerization initiator, α,α,α-trifluorotoluene and 2-dimethylaminoethyl)methacrylate (DMAEMA), adding a catalyst to the resulting mixture and then proceeding reaction, precipitating an impurity of the reaction solution, followed by purifying, and mixing the purified solution with 1-bromodecane, reacting the resulting mixture under a nitrogen atmosphere and precipitating an impurity, followed by purifying.

The radical polymerization initiator may include a perfluoropolyether (PFPE) atomic-transfer radical-polymerization (ATRP) macro-initiator.

The adding the catalyst and proceeding reaction may include adding copper bromide ($CuBr_2$) to the mixture of the radical polymerization initiator, the α,α,α-trifluorotoluene and 2-dimethylaminoethyl)methacrylate (DMAEMA), removing oxygen, adding N,N,N,N',N' pentamethyldiethylenetriamine (PMDET) to the remaining solution, and proceeding reaction of the mixture.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
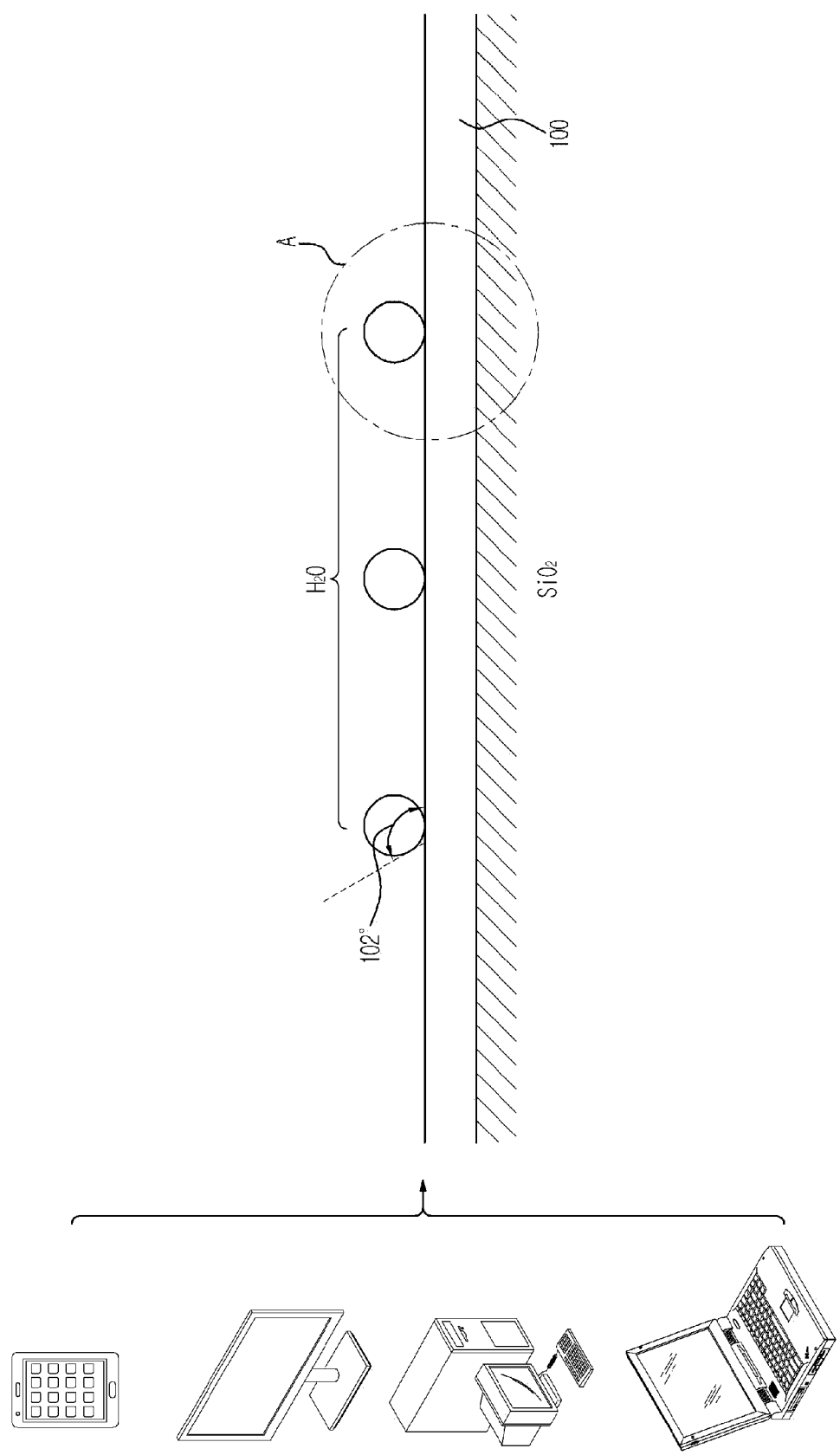
FIG. 1 is a view illustrating an object surface-coated with a coating composition according to an embodiment.

Hereinafter, embodiments of the present invention will be described with reference to the accompanying drawings.

Configurations described in embodiments and drawings described herein are provided only as preferred examples of the present invention and a variety of modifications which alternate the embodiments and drawings of the specification may be present at the filing date of the present application.

Hereinafter, embodiments of the present invention will be described in detail with reference to the annexed drawings.

An anti-bacterial and anti-fouling coating composition according to an embodiment of the present invention includes a compound containing a fluorine-based substituent represented by Formula 1, an ammonium-based substituent represented by Formula 2 and a silane-based substituent represented by Formula 3:

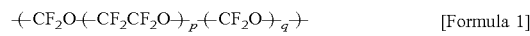  [Formula 1]

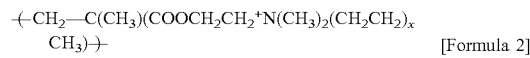  [Formula 2]

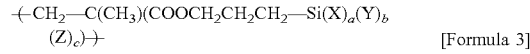  [Formula 3]

In Formula 1, p and q each represent an integer of 1 to 100, in Formula 2, x represents an integer of 1 to 20, and in Formula 3, X, Y and Z represent at least one of a methoxy group, an ethoxy group and a halogen element and a, b and c are integers satisfying an equation of a+b+c=3.

The anti-fouling function is obtained by the fluorine-based substituent represented by Formula 1 and the anti-bacterial function is obtained by the ammonium-based substituent represented by Formula 2. Consequently, the fluorine-based substituent and the ammonium-based substituent represented by Formulae 1 and 2, respectively, are contained in one compound to provide both the anti-fouling function and the anti-bacterial function. Meanwhile, the silane-based substituent represented by Formula 3 is provided to improve adhesion to a display surface material including a glass.

The compound containing the substituents of Formulae 1, 2 and 3 may be represented by the following Formulae 4 and 5 and the compound containing the substituents of Formulae 1 and 2 may be represented by the following Formulae 6 and 7.

[Formula 4]

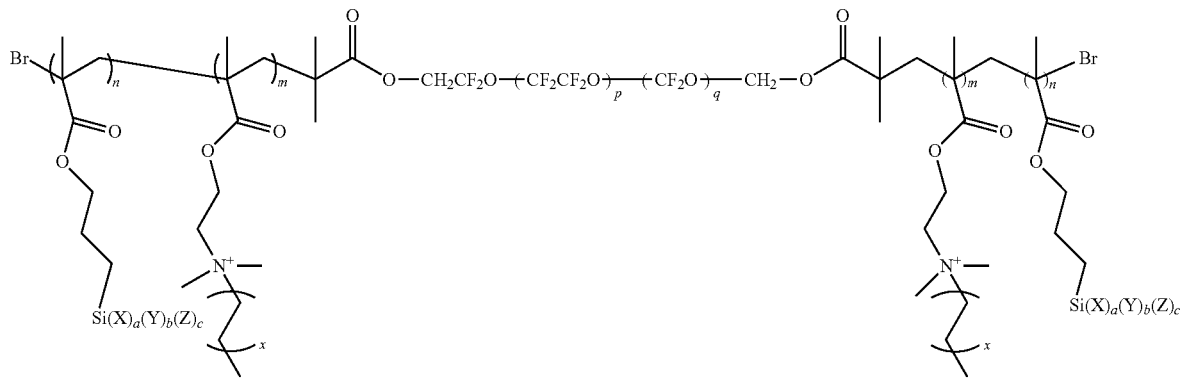

[Formula 5]

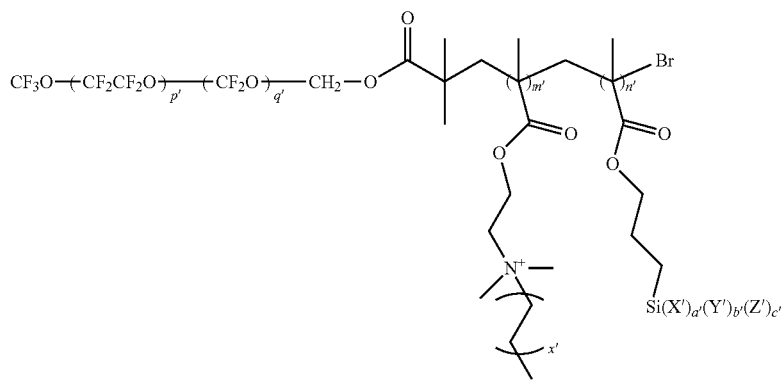

[Formula 6]

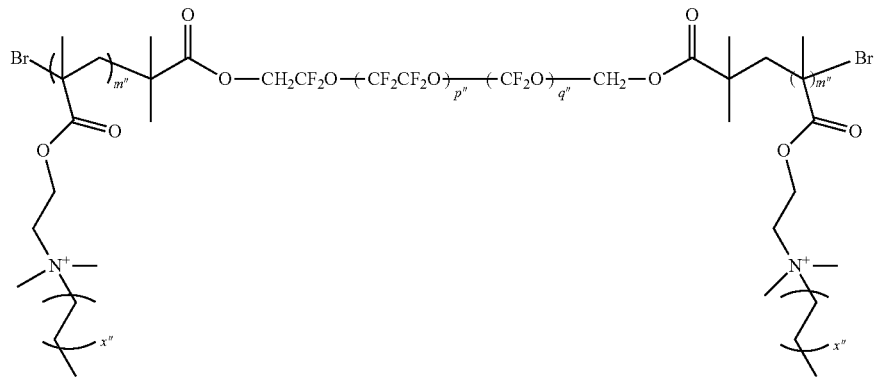

[Formula 7]

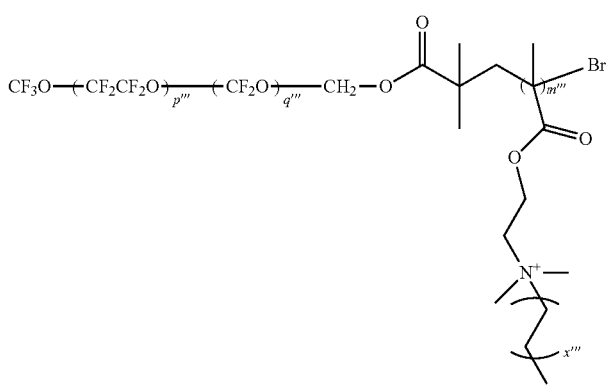

In Formula 4, m and n represent an integer of 1 to 100, p and q represent an integer of 1 to 100, x represents an integer of 1 to 20, X, Y and Z represent at least one of a methoxy group, an ethoxy group and a halogen element, and a, b and c are integers satisfying an equation of a+b+c=3.

In Formula 5, m' and n' represent an integer of 1 to 100, p' and q' represent an integer of 1 to 100, x' represents an integer of 1 to 20, X', Y' and Z' represent at least one of a methoxy group, an ethoxy group and a halogen element, and a', b' and c' are integers satisfying an equation of a'+b'+c'=3.

In Formula 6, m" represents an integer of 1 to 100, p" and q" represent an integer of 1 to 100, and x" represents an integer of 1 to 20.

In Formula 7, m'" represents an integer of 1 to 100, p'" and q'" represent an integer of 1 to 100, and x'" represents an integer of 1 to 20.

Next, an anti-bacterial and anti-fouling coating composition according to another embodiment will be described in detail. The anti-bacterial and anti-fouling coating composition according to the embodiment includes a compound represented by Formula 8.

by Formula 3. More specifically, the coating composition may include the compounds represented by Formulae 4 to 8, so a description of the features of the coating composition in the present embodiment are the same as the coating composition described above and are omitted for convenience.

FIG. 1 is a view illustrating an object surface-coated with a coating composition according to an embodiment.

Referring to FIG. 1, the anti-bacterial and anti-fouling film 100 according to the present embodiment may include a fluorine-based substituent represented by Formula 1, an ammonium-based substituent represented by Formula 2 and a silane-based substituent represented by Formula 3 and may be adhered to surfaces of objects such as screens of TVs, monitor screens of desktops or notebooks, screens of mobile equipment such as cellular phones or PDAs, or touch panels of electronic products.

In a case in which the film 100 is formed on a TV screen, the fluorine-based substituent is disposed on the screen surface and thus directly contacts a contaminant and the ammonium-based substituent is disposed on the outside from the surface of the object. In addition, the silane-based

[Formula 8]

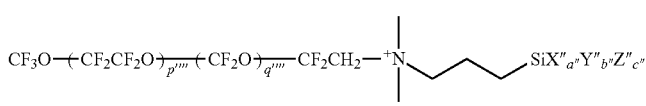

In Formula 8, p"" and q"" represent an integer of 1 to 100, X", Y" and Z" represent at least one of a methoxy group, an ethoxy group and a halogen element, and a", b", c" are integers satisfying an equation of a"−pb"−pc"=3.

The anti-fouling function is obtained by the fluorine-based substituent represented by Formula 8 and the anti-bacterial function is obtained by quaternary ammonium. Consequently, both the anti-fouling function and anti-bacterial function may be obtained by one compound.

Next, an anti-bacterial and anti-fouling film according to an embodiment will be described in detail.

The anti-bacterial and anti-fouling film according to the present embodiment is produced using the coating composition containing the fluorine-based substituent represented by Formula 1, the ammonium-based substituent represented by Formula 2, and the silane-based substituent represented substituent performs an anchoring function via siloxane bonding to a —OH group of silicon dioxide ($SiO_2$) or the like, used as a primer layer.

In addition, the anti-bacterial and anti-fouling film 100 according to the present embodiment has a contact angle to water ($H_2O$) of 100° to 180° to implement an anti-fouling function based on the fluorine-based substituent and anti-bacterial function based on the ammonium-based substituent, respectively. A principle of implementing the anti-fouling function and anti-bacterial function will be described with reference to the annexed drawings.

Figure 2:
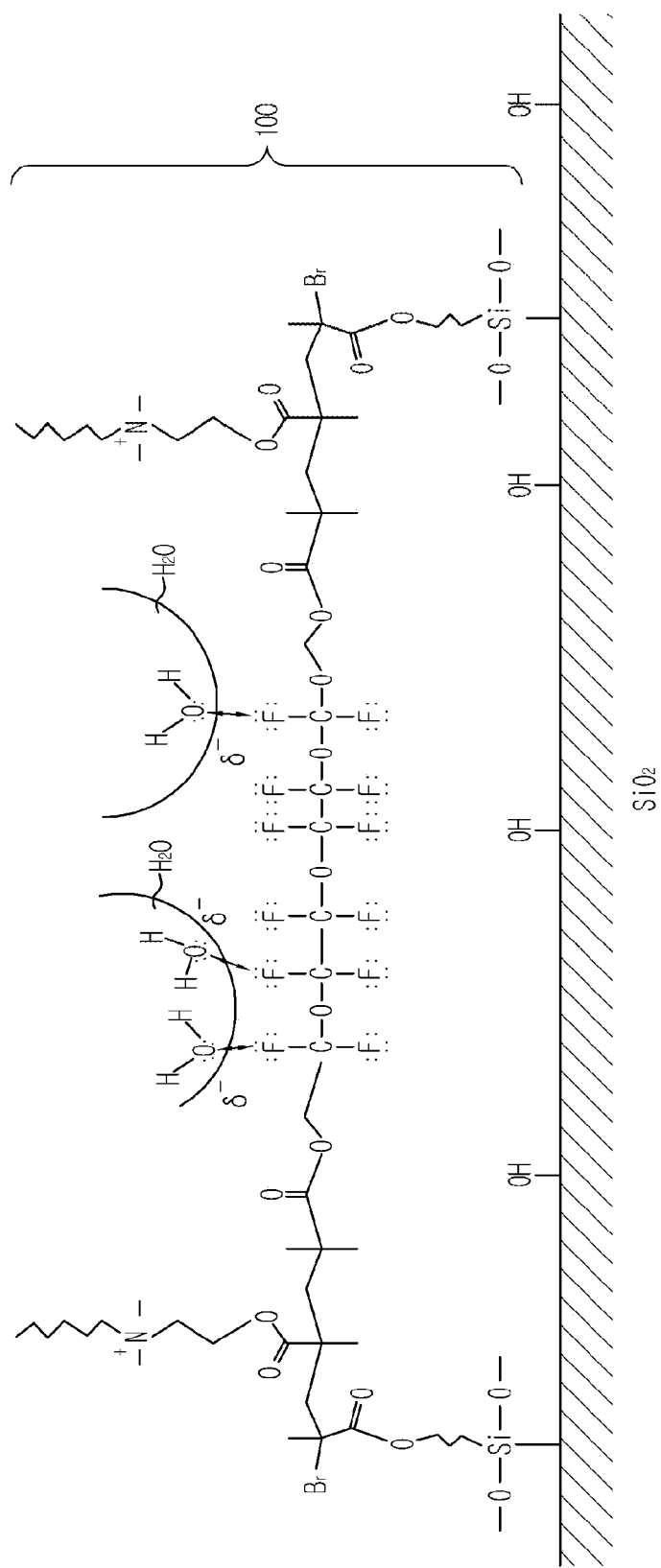
FIG. 2 is an enlarged view showing a region A of FIG. 1 to describe a principle of obtaining an anti-fouling function.

FIG. 2 is an enlarged view showing a region A of FIG. 1. A principle of implementing the anti-fouling function will be described in detail with reference to FIG. 2.

A contact angle is a parameter indicating an anti-fouling performance of a coating composition and the anti-fouling performance may be quantified by analysis of contact angle of water ($H_2O$). For example, anti-fouling performance when the contact angle is 90° to 180° is superior to that when the contact angle is 0° to 90°.

As described above, a fluorine atom which is a raw material of PFPE-based fluorine resin is exposed to the surface of the coating film 100 according to the present embodiment. The fluorine atom is an element of the Group 7 of the periodic table, which has seven electrons in the outermost shell thereof and is thus partially negatively charged. A water molecule ($H_2O$) has a structure in which two hydrogen atoms (H) are bonded at both sides of an oxygen atom (o) disposed in the center. More specifically, the central oxygen atom (O), a Group 6 element, is disposed such that the hydrogen atom (H) is bent toward both sides of the oxygen atom (o) so that the oxygen atom (o) has eight electrons in the outermost shell thereof and consequently, is partially negatively charged.

As a result, when a water molecule ($H_2O$) contacts a coating surface containing a PFPE-based fluorine resin as a raw material, the water molecule ($H_2O$) and the surface of the coating film 100 repel from each other due to partial negative charges contained in the outermost electrons of the fluorine atom (F) and the oxygen atom (o) of the water molecule ($H_2O$). Repulsion between water ($H_2O$) and the surface of the coating film 100 causes water ($H_2O$) to form a spherical aggregate as shown in FIGS. 1 and 2, thus increasing a contact angle of water ($H_2O$) on the coating surface.

Consequently, as the contact angle of water ($H_2O$) on the film 100 increases, anti-fouling performance becomes excellent and the anti-bacterial and anti-fouling film 100 according to the present embodiment having a contact angle of water ($H_2O$) of 100 to 180 degrees due to the fluorine-based substituent thus exhibits superior anti-fouling performance.

Figure 3:
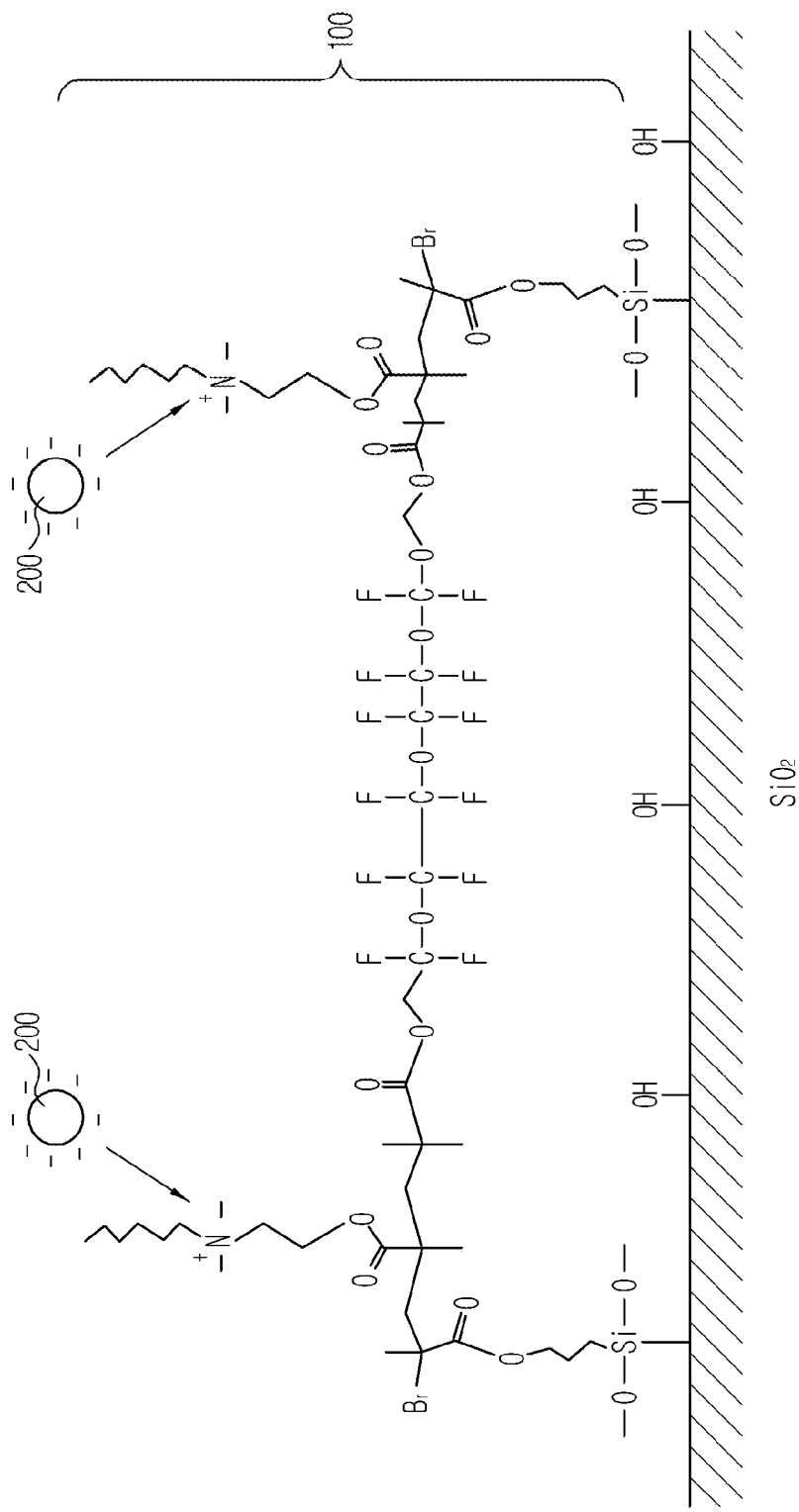
FIGS. 3 and 4 are views illustrating a process of obtaining the anti-bacterial function by quaternary ammonium disposed on a film surface.
Figure 4:
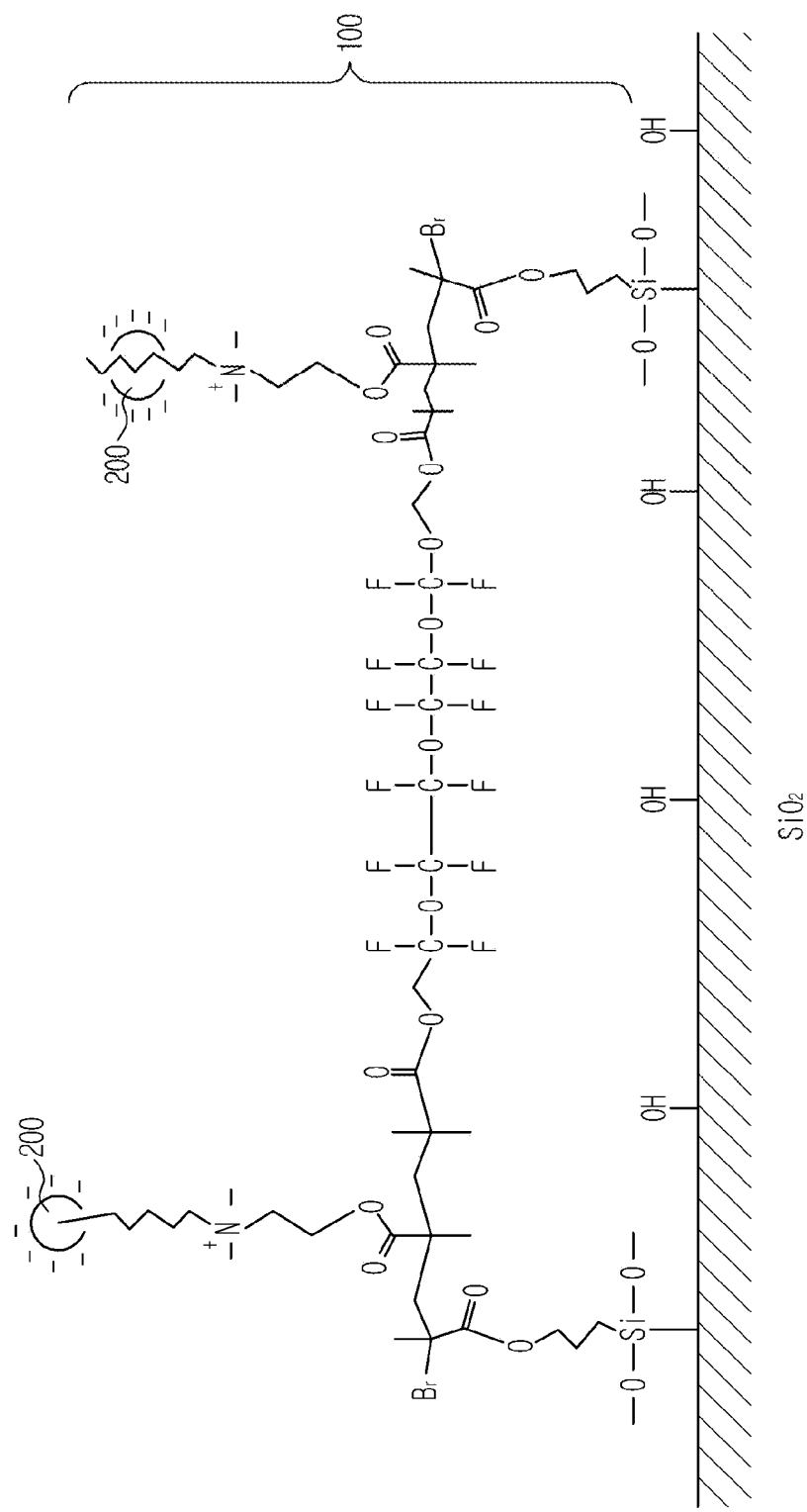

The anti-bacterial performance may be obtained by the quaternary ammonium disposed on the surface of the film 100. FIGS. 3 and 4 are views illustrating a process of obtaining the anti-bacterial function by the quaternary ammonium. A principle of obtaining both anti-fouling and anti-bacterial functions by the coating film 100 according to the present embodiment will be described in detail.

Referring to FIG. 3, a well-known bacterium, an *Escherichia coli* 200 has a negatively charged surface. When the *Escherichia coli* 200 having a negatively charged surface contacts a coating film 100 containing a quaternary ammonium polymer, electrostatic attraction is created by the positive charge of the quaternary ammonium and the negative charge of the *Escherichia coli* 200, thus causing the *Escherichia coli* 200 to be drawn toward the film 100.

Referring to FIG. 4, when the *Escherichia coli* 200 is drawn toward the film 100, the *E. coli* physically contacts a chain between the quaternary ammonium and cell membranes of the *E. coli* are thus destroyed. As a result, metabolic functions of the *Escherichia coli* 200 are eliminated and the anti-bacterial function is thus obtained.

Figure 5:
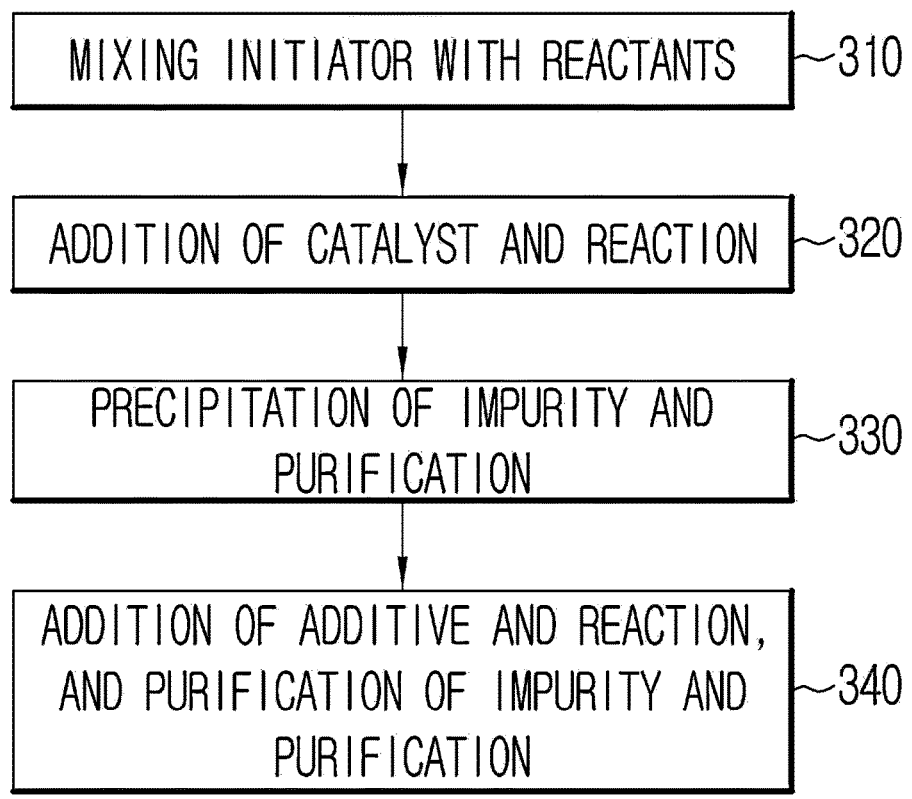
FIG. 5 is a view illustrating a method for preparing an anti-bacterial and anti-fouling coating composition according to an embodiment.

Next, a method of producing the anti-bacterial and anti-fouling coating composition as described above will be described in detail. FIG. 5 is a view illustrating a method for preparing the anti-bacterial and anti-fouling coating composition according to an embodiment.

Referring to FIG. 5, the method for preparing the anti-bacterial anti-fouling coating composition according to the present embodiment includes mixing an initiator with reactants (310), adding a catalyst to the resulting mixture and proceeding with a reaction therebetween (320), precipitating an impurity of the reaction solution, followed by purifying (330), and adding an additive to the purified solution, proceeding with a reaction under a nitrogen atmosphere and precipitating an impurity, followed by purifying (340).

More specifically, in the mixing (310), a radical polymerization initiator, α,α,α-trifluorotoluene and DMAEMA (2-(dimethylaminoethyl)methacrylate) are mixed.

The radical polymerization initiator may include a perfluoropolyether (PFPE) atomic-transfer radical-polymerization (ATRP) macro-initiator (hereinafter, referred to as a "PFPE radical polymerization initiator").

The PFPE radical polymerization initiator is added to initiate preparation of the anti-bacterial and anti-fouling coating composition according to an embodiment and the PFPE radical polymerization initiator to initiate preparation of the anti-bacterial and anti-fouling coating composition may be prepared by the following process.

1-1) A magnetic stirrer is added to a 100 ml one-neck round bottom flask, the flask is sealed with a septum and nitrogen is circulated while heating to remove water in the flask. Next, PFPE-2OH (3.3 mmol, 5 g), 20 ml of α,α,α-trifluorotoluene, and 1 mmol (1 g) of triethylamine are added to the flask using a needle, followed by slowly stirring.

Next, a 50 ml one-neck round bottom flask is prepared, a magnetic stirrer is added to the flask, the flask is sealed with a septum and nitrogen is circulated while heating to remove water in the flask. Next, 0.2 mol (4.6 g) of 2-bromoisobutyryl bromide and 5 ml of α,α,α-trifluorotoluene are added to the flask using a needle, followed by slowly stirring.

1-2) The 2-bromoisobutyryl bromide solution thus obtained is added to a solution in which PFPE-2OH is dissolved using a needle at 0° C. for 30 minutes. The resulting solution is reacted at 0° C. for 3 hours and then at room temperature for 15 hours.

1-3) A salt produced during the reaction described above is removed using a centrifuge and a product is extracted from the solution using α,α,α-trifluorotoluene and a saturated sodium carbonate ($NaHCO_3$) solution, and layer separation is performed. Next, α,α,α-trifluorotoluene is removed using a vacuum evaporator and the product is purified using methanol to obtain a PFPE radical polymerization initiator (310).

In the adding (320), copper bromide ($CuBr_2$) is added to the mixture obtained in (310), oxygen is removed and N,N,N,N',N' pentamethyldiethylenetriamine (PMDET) is added, followed by proceeding with a reaction. Furthermore, the removal of oxygen may be performed using freeze-pump-thaw (320).

In the precipitating (330), an impurity of the product obtained in (320) is precipitated and purified (330).

In the adding (340), the product obtained in (330) is mixed with 1-bromodecane and reacted under a nitrogen atmosphere. Then, the impurity is precipitated and purified to obtain an anti-bacterial and anti-fouling coating composition performing both an anti-bacterial function and an anti-fouling function (340).

Hereinafter, preferred preparation examples of the anti-bacterial and anti-fouling coating composition according to the embodiment and comparative examples will be described in detail.

Preparation Example 1

In a first operation, 0.05 mmol (0.1 g) of a PFPE radical polymerization initiator, 5 ml of α,α,α-trifluorotoluene, and 5.18 mmol (0.81 g) of DMAEMA (2-(dimethylaminoethyl) methacrylate) are added to a one neck round bottom flask and oxygen is removed using freeze-pump-thaw.

In a second operation, 0.1 mmol (0.015 g) of copper bromide ($CuBr_2$) is added to the solution obtained in the first operation and oxygen is removed using freeze-pump-thaw. Next, 0.1 mmol (0.018 g) of N,N,N,N',N'-pentamethyldiethylenetriamine is added to the reaction solution and a reaction is performed at 65° C. for 18 hours.

In a third operation, the product obtained in the second operation is passed through aluminum oxide ($Al_2O_3$) to remove the copper bromide ($CuBr_2$) and an impurity is precipitated using hexane and is then purified.

Results of NMR measurement of the produced poly (dimethylaminoethyl)methacrylate PFPE (hereinafter, referred to as "PDMAEMA-PFPE-PDMAEMA") are as follows:

$^1$H NMR ($CDCl_3$, TMS): δ=0.88 (3H, —$CH_3$), 1.00-1.90 (m, backbone), 2.28 (s, 3H, —$OCH_2CH_2N(CH_3)_2$), 2.56 (2H, —$OCH_2CH_2N(CH_3)_2$), 4.06 (2H, —$OCH_2CH_2N(CH_3)_2$)

In a fourth operation, 0.23 g of the PDMAEMA-PFPE-PDMAEMA synthesized in the third operation and 15 g of 1-bromodecane are added to a 50 ml one-neck round bottom flask and reacted under a nitrogen atmosphere at 40° C. for 48 hours. An impurity is precipitated using ethyl acetate and the residue is purified. Results of NMR measurement of the produced PFPE quaternary ammonium polymer are as follows:

$^1$H NMR ($CDCl_3$, TMS): δ=0.88 (3H, —$CH_3$), 1.00-1.90 (m, backbone), 1.26 (2H, —$N^+(CH_3)_2$—$CH_2CH_2CH_2CH_2CH_2CH_2CH_2CH_2CH_3$), 3.47 (3H, —$CH_2N±(CH_3)_2CH_2$—), 3.73 (2H, — C(O)$OCH_2CH_2N+$—), 4.55 (2H, —$C(O)OCH_2CH_2N+$—)

Comparative Example 1

In Comparative Example 1, poly(3-trimethoxysilylpropyl)methacrylate is prepared using a PFPE radical polymerization initiator.

In a first operation, 0.18 mmol (0.344 g) of the PFPE radical polymerization initiator synthesized in Preparation Example 1 described above, 10 ml of α,α,α-trifluorotoluene and 9 mmol (2.25 g) of 3-(trimethoxysilylpropyl)methacrylate (TMSPMA) are added to a one neck round bottom flask and oxygen is removed using freeze-pump-thaw.

In a second operation, copper bromide ($CuBr_2$, 0.36 mmol, 0.052 g) is added to the solution prepared in the first operation and oxygen is removed using freeze-pump-thaw. Next, 0.36 mmol (0.063 g) of N,N,N,N',N'-PMDET is added to the resulting mixture and a reaction is performed at 65° C. for 18 hours.

In a third operation, the product obtained in the second operation is passed through aluminum oxide ($Al_2O_3$) to remove the copper bromide ($CuBr_2$) and is purified by precipitating an impurity using dimethylsulfoxide (DMSO). Results of NMR measurement of the produced PTMSPMA-PFPE-PTMSPMA are as follows.

$^1$H NMR ($CDCl_3$, TMS): δ=0.65 (2H, —$C(O)OCH_2CH_2CH_2Si$—), 0.85 (3H, —$CH_3$), 1.00-1.90 (m, backbone), 1.72 (2H, —$C(O)OCH_2CH_2CH_2Si$—), 3.58 (3H, —$Si(OCH_3)_3$), 3.90 (2H, — $C(O)OCH_2CH_2CH_2Si$—)

Experimental Example 1

In Experimental Example 1, contact angles of coating compositions prepared in Preparation Example 1 and Comparative Example 1 to water are measured.

Experimental Example 2

In Experimental Example 2, *Staphylococcus aureus* is cultured on films 100 formed using coating compositions prepared in Preparation example 1 and Comparative Example 1 and bacteria decrease proportion is measured.

TABLE 1

| | Preparation Example 1 | Comparative Example 1 |
|---|---|---|
| Coating substance | (structure shown) | (structure shown) |
| Contact angle | 102 | 107 |
| Bacteria decrease proportion (%) | 99.9 | 65 |

As can be seen from Table 1, a contact angle of the coating composition of Preparation example 1 is 102° and a contact angle of the coating composition of Comparative Example 1 is 107°. That is, the coating compositions of Preparation example 1 and Comparative Example 1 exhibit similar levels of anti-fouling performance.

Next, the coating composition of Preparation example 1 exhibits a bacteria decrease proportion of 99.9%, the coating composition of Comparative Example 1 exhibits a bacteria decrease proportion of 65%. That is, the coating composition of Preparation Example 1 containing a quaternary ammonium group exhibits a higher bacteria decrease proportion than that of the coating composition of Comparative Example 1.

Figure 6:
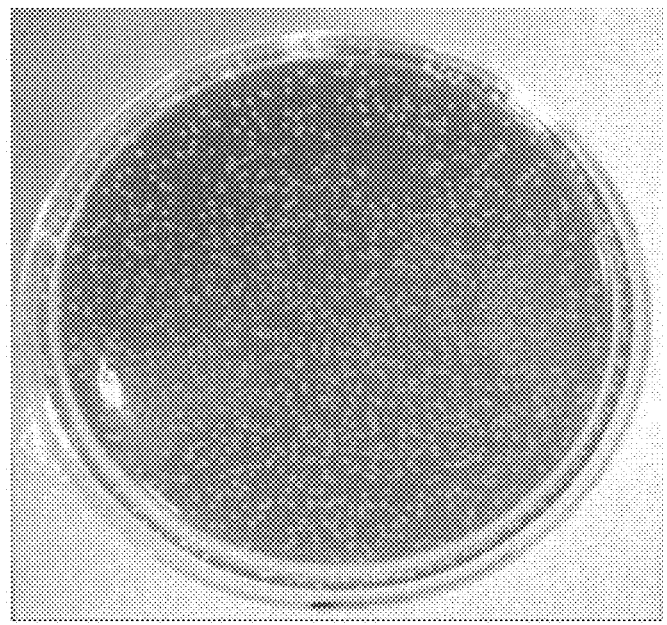
FIGS. 6(b) and (a) are, respectively, views illustrating an anti-bacterial effect of a coating composition prepared in Preparation Example 1 as compared to a general glass.
Figure 6:
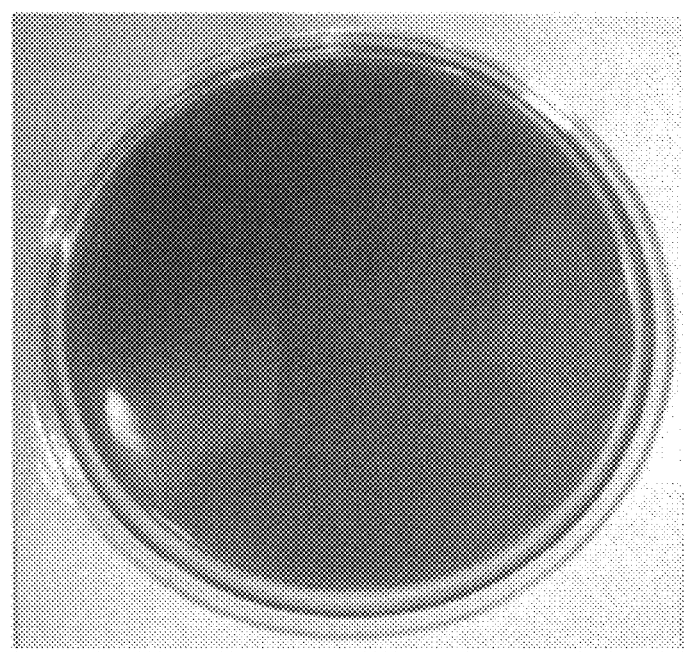

FIG. 6 is a view illustrating an anti-bacterial effect of the coating composition prepared in Preparation Example 1 as compared to a general glass.

More specifically, FIG. 6A is an image showing a colony of *Staphylococcus aureus* cultured on a general glass surface and FIG. 6B is an image showing a colony of *Staphylococcus aureus* cultured on a surface of a glass coated with the coating composition prepared in Preparation example 1. Referring to FIGS. 6A and 6B, the coating composition prepared in Preparation Example 1 (FIG. 6B) exhibits a bacteria removal proportion of 99.9% which is higher than that of the general glass (FIG. 6A).

Consequently, the coating composition prepared in Comparative Example 1 is different from the coating composition prepared in Preparation Example 1 in that the coating composition prepared in Comparative Example 1 provides only an anti-fouling function, while the coating composition prepared in Preparation Example 1 provides both an anti-fouling function and an anti-bacterial function.

Next, an electronic device according to an embodiment of the present invention will be described in detail.

The electronic device according to the present embodiment includes a display panel and a film 100 bonded to the display panel. Here, the film 100 includes the fluorine-based substituent represented by Formula 1 and at least one of ammonium-based substituent represented by Formula 2. In addition, an electronic device according to another embodiment may further include at least one silane-based substituent represented by Formula 3.

More specifically, the film 100 of the electronic device according to the present embodiment may be formed using the coating composition containing the compounds represented by Formulae 4 to 7. Hereinafter, a description of the same features as the coating composition and the film 100 described above is omitted.

It would be understood that the electronic device according to the present embodiment includes a touch panel, an information terminal and the like. Hereinafter, a touch panel of a smart phone 400 to which the coating composition of Preparation Example 1 is applied will be described with reference to FIG. 7(a), compared to a touch panel of a smart phone 400 to which the coating composition of Comparative Example 1 is applied (FIG. 7(b)).

Figure 7:
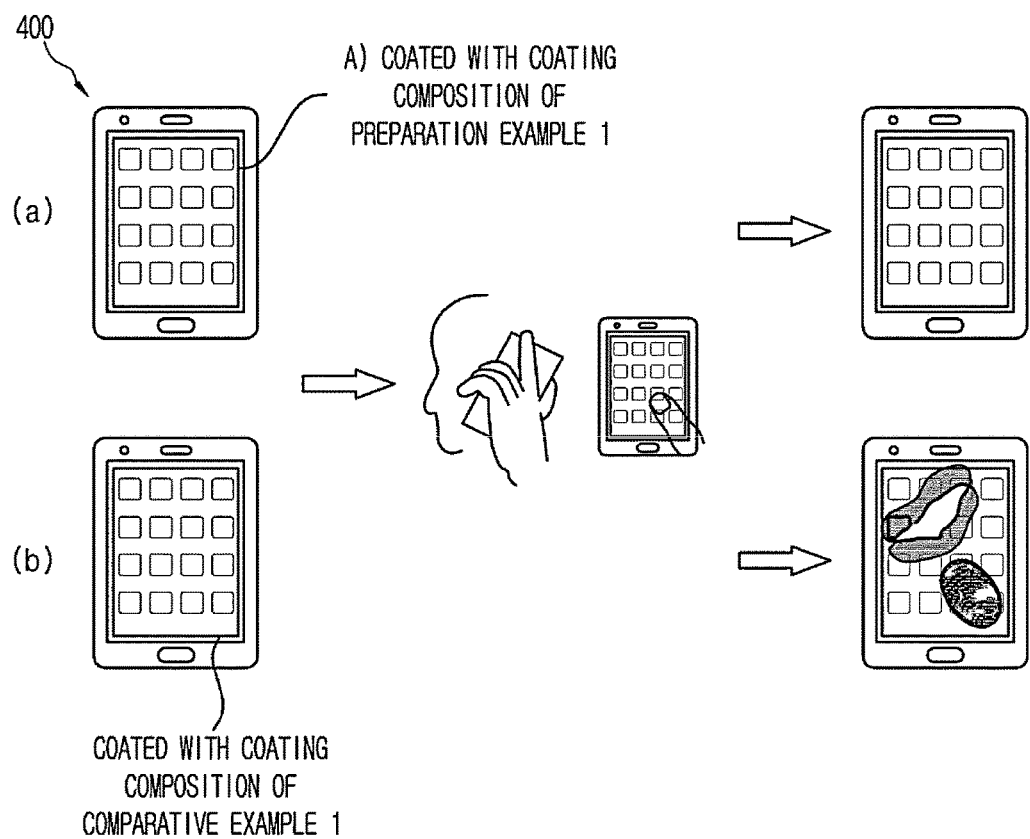
FIGS. 7(a) and (b) are, respectively views illustrating comparison between a touch panel of a smart phone using the coating composition of Preparation example 1 and a touch panel of a smart phone using the coating composition of Comparative Example 1.

FIG. 7(a) shows a smart phone 400 using Preparation example 1 and (b) is a smart phone 400 using Comparative Example 1. When calling using the smart phone 400, a user's face contacts a screen of the phone and oils or cosmetics present on the face are transferred to the screen. In addition, when searching or message writing using the smart phone 400, the screen is touched by the user's fingers, and fingerprints are transferred to the screen.

Although oils or cosmetics present in the face are transferred to the screen of the smart phone 400 of FIG. 7(a), the contaminant components are readily detached from the screen due to properties of the coating composition of Preparation Example 1. As described above, the coating composition of Preparation Example 1 has a large contact angle to water (H2O), thus making detachment of contaminants on the coating film easy.

On the other hand, in the case of the smart phone 400 of FIG. 7(b), the composition coated on the screen has a small contact angle to water (H2O), as compared to FIG. 7(a), thus making detachment of contaminants on the coating film difficult, keeping the contaminants on the screen and making the screen look dirty.

The film 100 of the electronic device according to the present embodiment may include a film 100 formed using the coating composition represented by Formula 8. Hereinafter, a description of the same features as the coating composition and the film 100 described above is omitted.

As apparent from the foregoing, the anti-bacterial and anti-fouling coating composition and the film formed using the same according to the embodiments of the present invention have the following beneficial effects.

A coating layer is formed using a single coating composition having anti-bacterial and anti-fouling functions, thereby simplifying the overall process.

In addition, the anti-bacterial and anti-fouling coating composition is harmless to humans and is safe from an environmental aspect, as compared to heavy metal anti-bacterial agents.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An anti-bacterial and anti-fouling coating composition comprising:
a compound having a fluorine-based substituent represented by the following Formula 1 and at least one ammonium-based substituent represented by the following Formula 2:

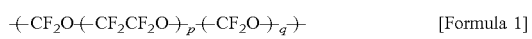

[Formula 1]

wherein p and q each independently represent an integer of 1 to 100,

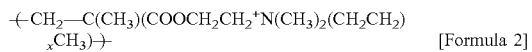

[Formula 2]

wherein x represents an integer of 1 to 20.

2. The anti-bacterial and anti-fouling coating composition according to claim 1, wherein the compound further comprises at least one silane-based substituent represented by the following Formula 3:

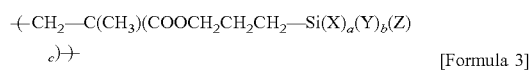

[Formula 3]

wherein X, Y and Z represent at least one of a methoxy group, an ethoxy group and a halogen element and a, b and c are integers satisfying an equation of a+b+c=3.

3. The anti-bacterial and anti-fouling coating composition according to claim 2, wherein the compound is represented by the following Formula 4:

[Formula 4]

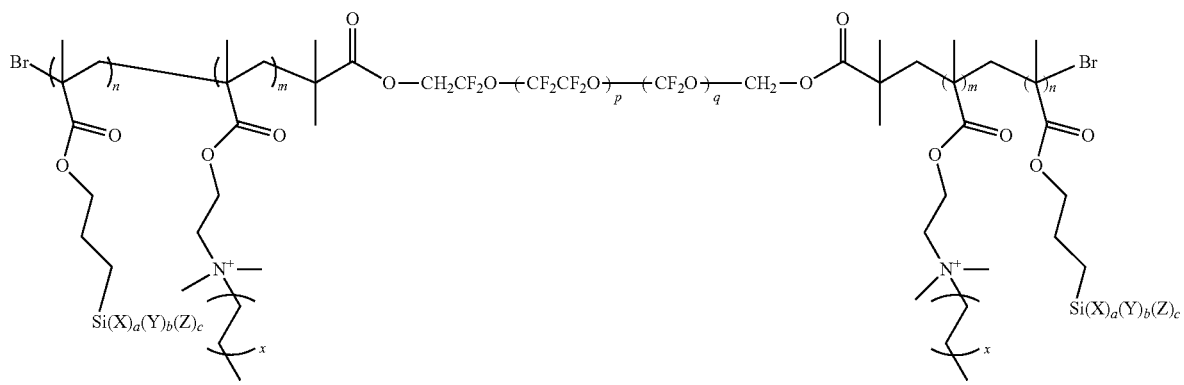

wherein m and n represent an integer of 1 to 100, p and q represent an integer of 1 to 100, x represents an integer of 1 to 20, X, Y and Z represent at least one of a methoxy group, an ethoxy group and a halogenelement, and a, b and c are integers satisfying an equation of a+b+c=3.

4. The anti-bacterial and anti-fouling coating composition according to claim 2, wherein the compound is represented by the following Formula 5:

[Formula 5]

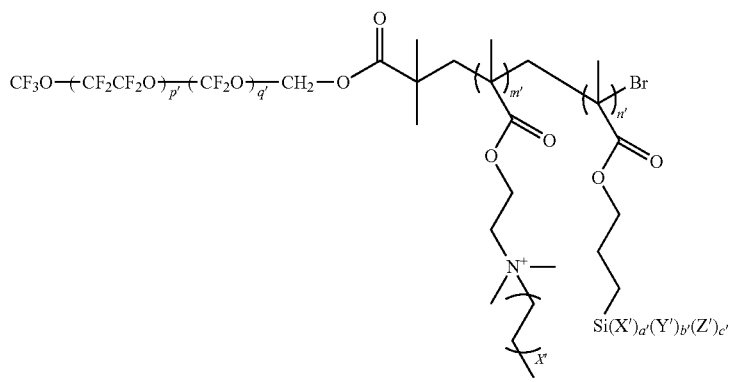

wherein m' and n' represent an integer of 1 to 100, p' and q' represent an integer of 1 to 100, x' represents an integer of 1 to 20, X', Y' and Z' represent at least one of a methoxy group, an ethoxy group and a halogen element, and a', b' and c' are integers satisfying an equation of a'+b'+c'=3.

5. The anti-bacterial and anti-fouling coating composition according to claim 1, wherein the compound is represented by the following Formula 6:

[Formula 6]

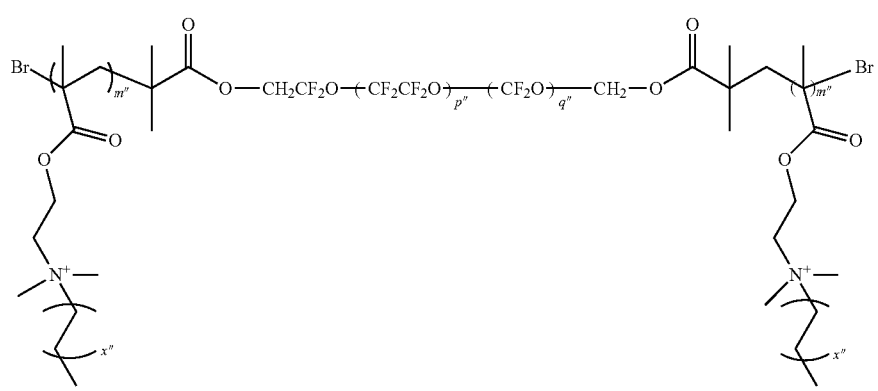

wherein m'' represents an integer of 1 to 100, p'' and q'' represent an integer of 1 to 100, and x'' represents an integer of 1 to 20.

6. The anti-bacterial and anti-fouling coating composition according to claim 1, wherein the compound is represented by the following formula 7:

[Formula 7]

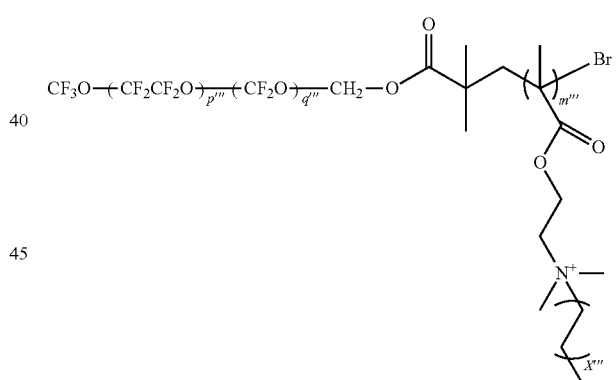

wherein m''' represents an integer of 1 to 100, p''' and q''' represent an integer of 1 to 100, and x''' represents an integer of 1 to 20.

7. An anti-bacterial and anti-fouling coating composition comprising a compound represented by the following Formula 8:

[Formula 8]

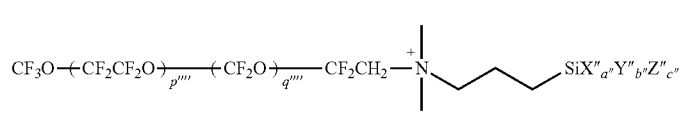

wherein p'''' and q'''' represent an integer of 1 to 100, X", Y" and Z" represent at least one of a methoxy group, an ethoxy group and a halogen element, and a", b", c" are integers satisfying an equation of a"+b"+c"=3.

8. An anti-bacterial and anti-fouling film formed using the coating composition according to claim 1.

9. The anti-bacterial and anti-fouling film according to claim 8, wherein the film has a contact angle to water, of about 100 to about 180 degrees.

10. An anti-bacterial and anti-fouling film formed using the coating composition according to claim 7.

11. The anti-bacterial and anti-fouling film according to claim 10, wherein the film has a contact angle to water, of about 100 to about 180 degrees.

12. An electronic device comprising:
a display panel; and
the film according to claim 7, adhered to the display panel.

13. An electronic device comprising:
a display panel; and
the film according to claim 9, adhered to the display panel.

* * * * *

UNITED STATES PATENT AND TRADEMARK OFFICE
CERTIFICATE OF CORRECTION

PATENT NO.       : 9,670,368 B2
APPLICATION NO.  : 14/586440
DATED            : June 6, 2017
INVENTOR(S)      : Byung Ha Park et al.

Page 1 of 1

It is certified that error appears in the above-identified patent and that said Letters Patent is hereby corrected as shown below:

On the Title Page

Column 1, Item [73] (Assignee), Line 3, below "SAMSUNG ELECTRONICS CO., LTD, Suwon-Si (KR)", insert --SNU R&DB FOUNDATION, Seoul (KR)--.

Signed and Sealed this
Tenth Day of July, 2018

Andrei Iancu
*Director of the United States Patent and Trademark Office*